US012694687B2

(12) United States Patent
Ren et al.

(10) Patent No.: US 12,694,687 B2
(45) Date of Patent: Jul. 28, 2026

(54) METHODS AND SYSTEMS FOR DETECTING FOREIGN OBJECTS ON A LANDING SURFACE

(71) Applicant: Honeywell International Inc., Charlotte, NC (US)

(72) Inventors: Zhiguo Ren, Shanghai (CN); Alberto Speranzon, Plymouth, MN (US); Juan Hu, Shanghai (CN); Vijay Venkataraman, Plymouth, MN (US)

(73) Assignee: Honeywell International, Inc., Charlotte, NC (US)

( * ) Notice: Subject to any disclaimer, the term of this patent is extended or adjusted under 35 U.S.C. 154(b) by 544 days.

(21) Appl. No.: 17/564,452

(22) Filed: Dec. 29, 2021

(65) Prior Publication Data

US 2023/0206646 A1 Jun. 29, 2023

(51) Int. Cl.
*G06V 20/58* (2022.01)
*B64U 101/30* (2023.01)
(Continued)

(52) U.S. Cl.
CPC .............. *G06V 20/58* (2022.01); *G06T 3/20* (2013.01); *G06T 3/60* (2013.01); *G06T 7/74* (2017.01);
(Continued)

(58) Field of Classification Search
CPC ...... G06V 20/58; G06V 20/17; G06V 20/176; G06V 10/245; G06T 3/20; G06T 3/60;
(Continued)

(56) References Cited

U.S. PATENT DOCUMENTS 8,022,841 B2 9/2011 Alon et al.
8,446,468 B1 * 5/2013 Medioni ................. G06T 7/254
348/144
(Continued)

FOREIGN PATENT DOCUMENTS

CN 102778701 A 11/2012
CN 109946751 A 6/2019
(Continued)

OTHER PUBLICATIONS

Wang, T., Zhang, Z., Yang, F., & Tsui, K. (2021). Intelligent Railway Foreign Object Detection: A Semi-supervised Convolutional Autoencoder Based Method. ArXiv, abs/2108.02421 (Year: 2021).*
(Continued)

*Primary Examiner* — Matthew C Bella
*Assistant Examiner* — Janice E. Vaz
(74) *Attorney, Agent, or Firm* — Alston & Bird LLP

(57) ABSTRACT

Disclosed are methods, systems, and computer-implemented method for detecting foreign objects on a landing surface. For instance, the method may include capturing an image from one or more cameras associated with a vehicle, detecting the landing surface present in the captured image, retrieving a reference image for the detected landing surface, and extracting a plurality of feature points present in both the captured image and the reference image. The method may further include determining a transformation between the captured image and the reference image by correlating the plurality of feature points between the captured image and the reference image, creating a virtual image by applying the transformation to one of the captured image or the reference image, and comparing the virtual image to the other one of the captured image or the reference image that was not transformed to detect one or more foreign objects.

19 Claims, 8 Drawing Sheets

(51) Int. Cl.

| | |
|---|---|
| *G06T 3/20* | (2006.01) |
| *G06T 3/60* | (2024.01) |
| *G06T 7/73* | (2017.01) |
| *G06V 20/10* | (2022.01) |
| *G06V 20/17* | (2022.01) |

(52) U.S. Cl.
CPC ............ *G06V 20/17* (2022.01); *G06V 20/176* (2022.01); *B64U 2101/30* (2023.01); *G06T 2207/10032* (2013.01); *G06T 2207/30261* (2013.01)

(58) Field of Classification Search
CPC ............. G06T 7/74; G06T 2207/10032; G06T 2207/30261; B64U 2101/30
See application file for complete search history.

(56) References Cited

U.S. PATENT DOCUMENTS

| | | | | | |
|---|---|---|---|---|---|
| 9,260,180 | B2 | 2/2016 | Puyou et al. | | |
| 10,335,838 | B2 | 7/2019 | Safai et al. | | |
| 2010/0109913 | A1 | 5/2010 | Nitzan et al. | | |
| 2011/0063445 | A1* | 3/2011 | Chew | ..................... | G06V 20/52 |
| | | | | | 348/E7.085 |
| 2014/0297068 | A1* | 10/2014 | Revell | ................... | G08G 5/025 |
| | | | | | 701/16 |
| 2017/0334578 | A1* | 11/2017 | Fleck | ..................... | B64D 47/08 |
| 2019/0354772 | A1* | 11/2019 | Tasli | ....................... | G06F 18/22 |
| 2020/0097721 | A1* | 3/2020 | Yakimenko | .......... | G05D 1/0094 |

FOREIGN PATENT DOCUMENTS

| | | | | | |
|---|---|---|---|---|---|
| CN | 110673141 | A | | 1/2020 | |
| CN | 111832634 | A | * 10/2020 | ......... | G06F 18/2415 |
| EP | 1995707 | B1 | | 11/2008 | |
| EP | 2678835 | B1 | | 1/2014 | |
| KR | 102302312 | B1 | | 9/2021 | |
| WO | WO 2009/029051 | A1 | | 3/2009 | |
| WO | WO 2014/033643 | A1 | | 3/2014 | |

OTHER PUBLICATIONS

Zhiguo, Ren et al., "An Effective Method Of Foreign Object Detection For UAM Safe Landing, Patent Survey And Analysis", *Aero AT*, Mar. 16, 2021.
Cheng-Hua Pai et al: "Moving Object Detection on a Runway Prior to Landing Using an Onboard Infrared Camera", 2007 IEEE Conference on Computer Vision and Pattern Recognition, Jun. 1, 2007 (Jun. 1, 2007), pp. 1-8.
European search report Mailed on May 19, 2023 for EP Application No. 22214021, 8 page(s).

* cited by examiner

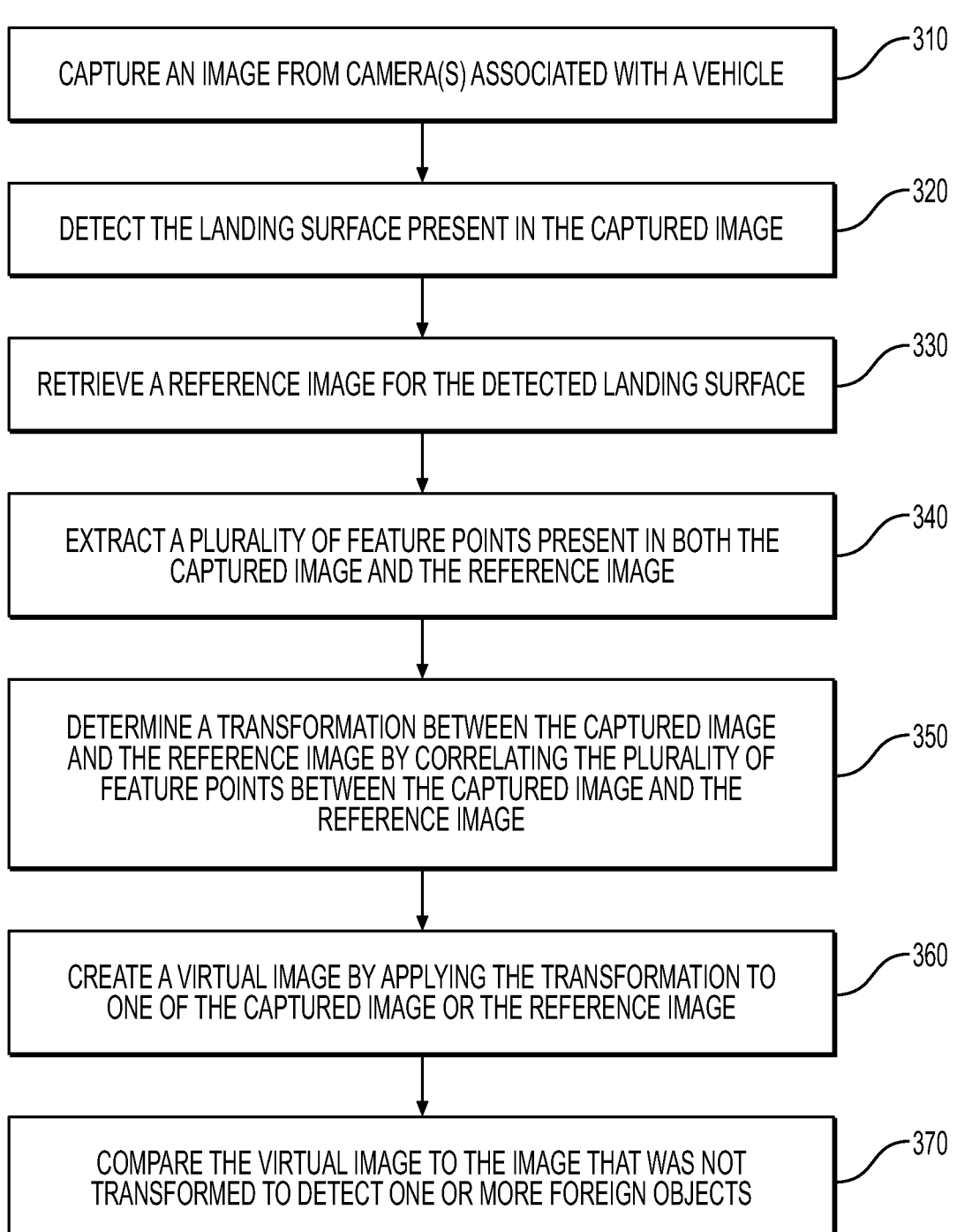

300

CAPTURE AN IMAGE FROM CAMERA(S) ASSOCIATED WITH A VEHICLE ⟋310

DETECT THE LANDING SURFACE PRESENT IN THE CAPTURED IMAGE ⟋320

RETRIEVE A REFERENCE IMAGE FOR THE DETECTED LANDING SURFACE ⟋330

EXTRACT A PLURALITY OF FEATURE POINTS PRESENT IN BOTH THE CAPTURED IMAGE AND THE REFERENCE IMAGE ⟋340

DETERMINE A TRANSFORMATION BETWEEN THE CAPTURED IMAGE AND THE REFERENCE IMAGE BY CORRELATING THE PLURALITY OF FEATURE POINTS BETWEEN THE CAPTURED IMAGE AND THE REFERENCE IMAGE ⟋350

CREATE A VIRTUAL IMAGE BY APPLYING THE TRANSFORMATION TO ONE OF THE CAPTURED IMAGE OR THE REFERENCE IMAGE ⟋360

COMPARE THE VIRTUAL IMAGE TO THE IMAGE THAT WAS NOT TRANSFORMED TO DETECT ONE OR MORE FOREIGN OBJECTS ⟋370

FIG. 3

400
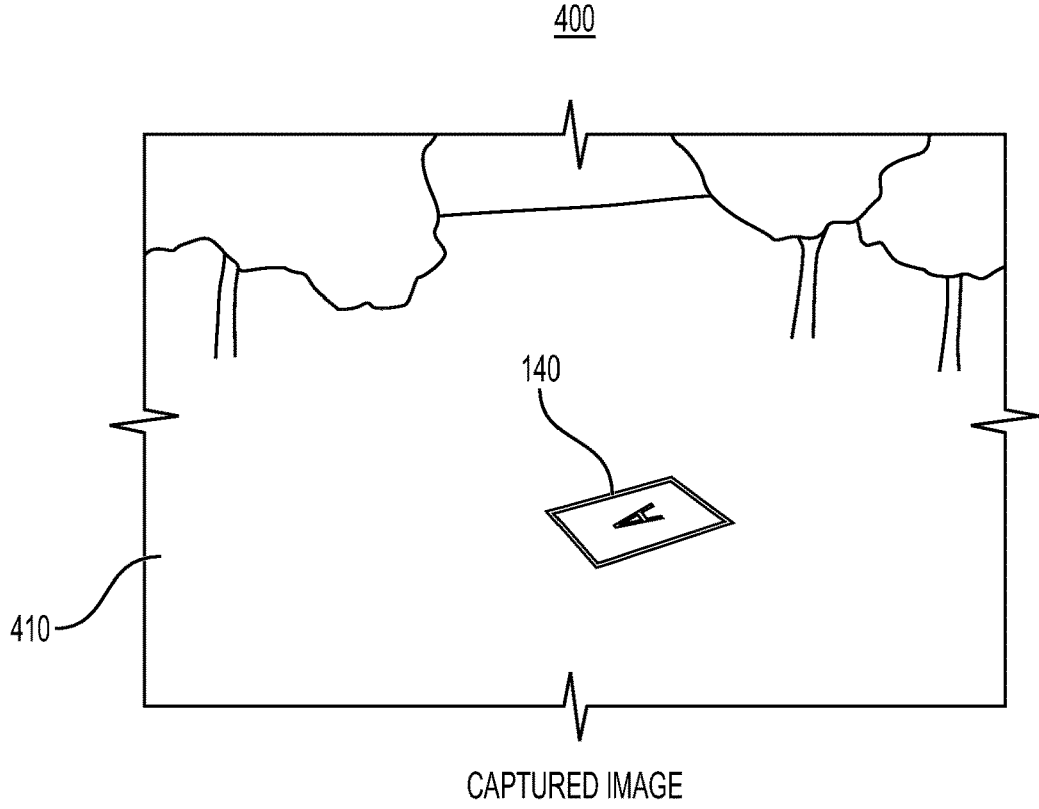
CAPTURED IMAGE
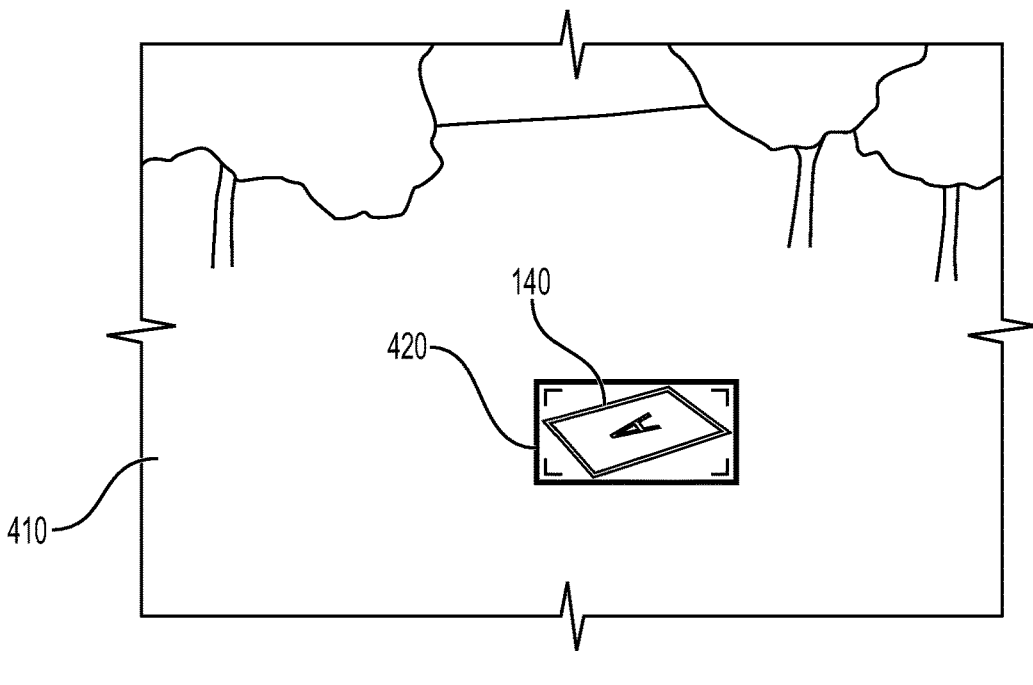
PAD DETECTION RESULT
*FIG. 4*

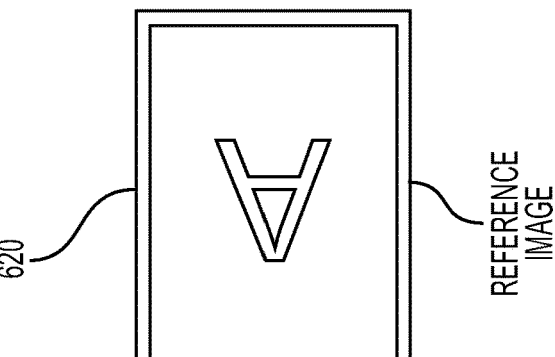
620
REFERENCE
IMAGE
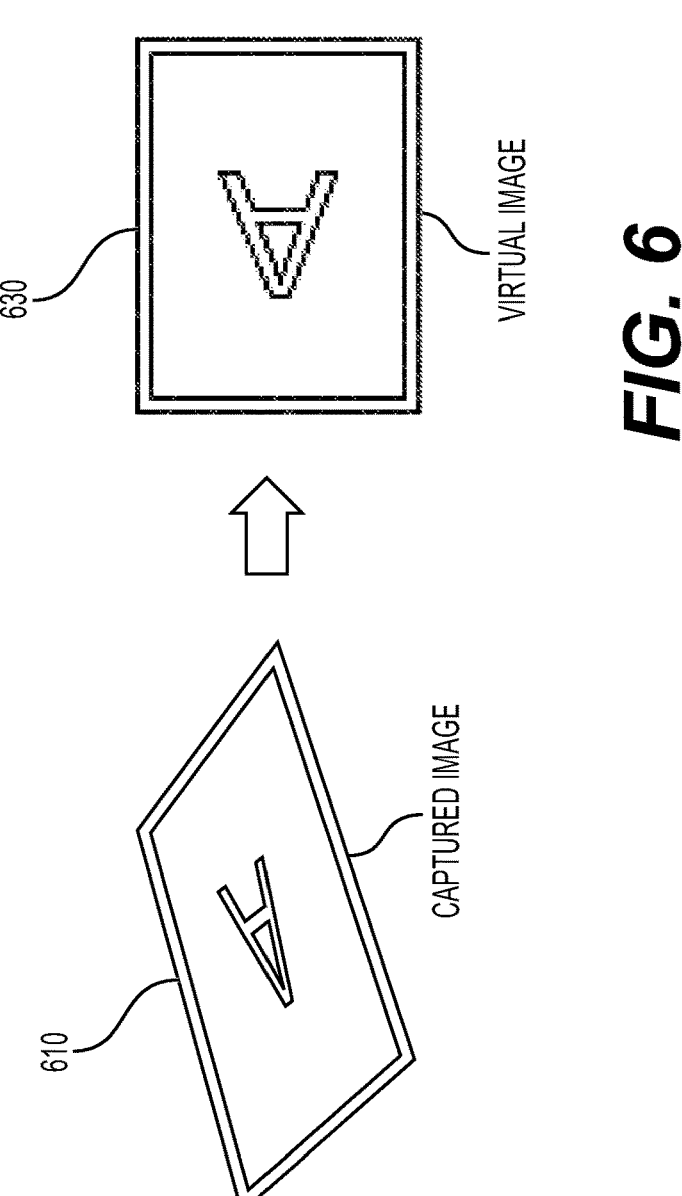
630
VIRTUAL IMAGE
610
CAPTURED IMAGE
*FIG. 6*

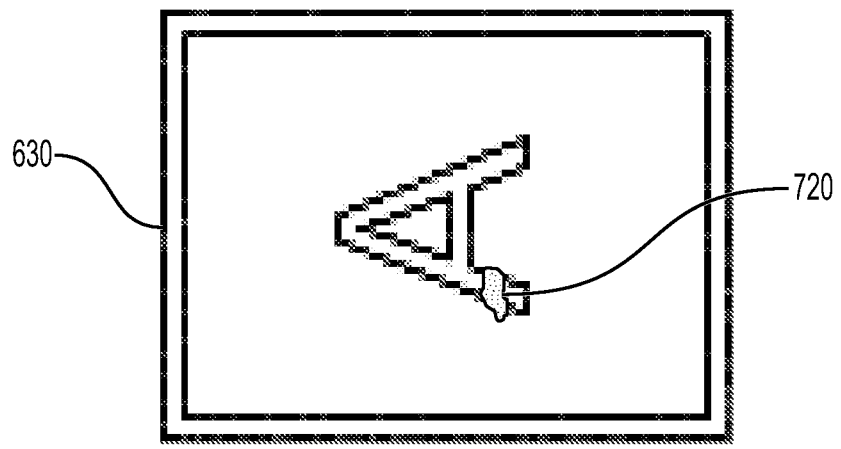
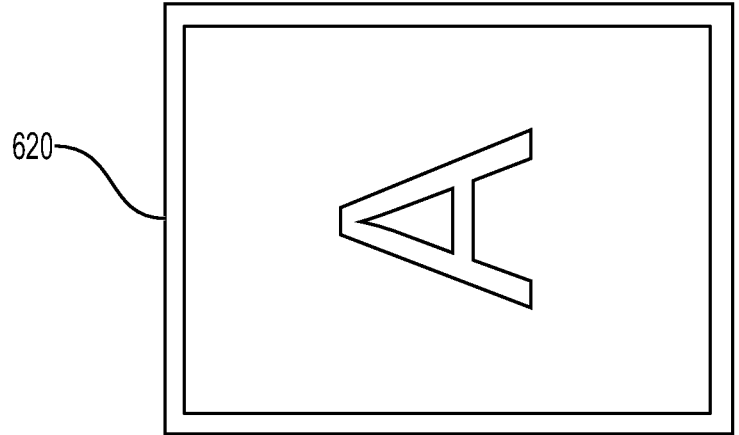
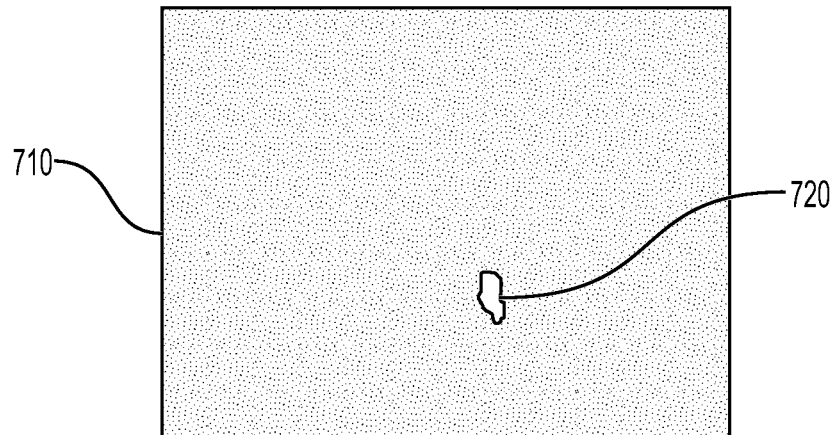
FIG. 7

METHODS AND SYSTEMS FOR DETECTING FOREIGN OBJECTS ON A LANDING SURFACE

TECHNICAL FIELD

Various embodiments of the present disclosure relate generally to the field of navigation for urban air mobility vehicles and, more particularly, to methods and systems for detecting foreign objects on a landing surface.

BACKGROUND

Urban air mobility (UAM) vehicles are increasingly used to transport cargo and/or passengers through an airspace. These vehicles are often configured for autonomous flight, and during such operation, traditional autonomous operations may not be able to determine if it is feasible and safe to land on a detected landing surface. Due to complicated visual conditions such as weather and lighting, as well as an automated system's lack of familiarity with the specific landing surface and/or foreign objects that may be located thereon, autonomous landings may be impractical and call for manual intervention. This may require substantial attention of a vehicle operator to safely land such a vehicle, even when the flight itself is able to be operated autonomously.

The present disclosure is directed to overcoming one or more of these above-referenced challenges.

SUMMARY OF THE DISCLOSURE

According to certain aspects of the disclosure, systems and methods are disclosed for detecting foreign objects on a landing surface.

For instance, a method for detecting foreign objects on a landing surface can include capturing an image from one or more cameras associated with a vehicle, detecting the landing surface present in the captured image, retrieving a reference image for the detected landing surface, and extracting a plurality of feature points present in both the captured image and the reference image. The method may further include determining a transformation between the captured image and the reference image by correlating the plurality of feature points between the captured image and the reference image, creating a virtual image by applying the transformation to one of the captured image or the reference image, and comparing the virtual image to the other one of the captured image or the reference image that was not transformed to detect one or more foreign objects.

Moreover, a system for detecting foreign objects on a landing surface may include one or more cameras associated with a vehicle, a memory storing instructions, and one or more processors executing the instructions to perform a process for detecting foreign objects on a landing surface. The process performed can include capturing an image from the one or more cameras associated with the vehicle, detecting the landing surface present in the captured image, retrieving a reference image for the detected landing surface, and extracting a plurality of feature points present in both the captured image and the reference image. The process can further include determining a transformation between the captured image and the reference image by correlating the plurality of feature points between the captured image and the reference image, creating a virtual image by applying the transformation to one of the captured image or the reference image, and comparing the virtual image to the other one of the captured image or the reference image that was not transformed to detect one or more foreign objects.

Moreover, a computer-implemented method for detecting foreign objects on a landing surface can include capturing, by one or more cameras mounted on a lower surface of a vehicle, an image including the landing surface; detecting, by one or more processors, the landing surface present in the captured image; retrieving, from a database, a reference image for the landing surface present in the captured image; and extracting, from both the captured image and the reference image, a plurality of corresponding feature points. The computer-implemented method may further include determining a transformation including a rotation and a translation between the captured image and the reference image by correlating the plurality of corresponding feature points; creating a virtual image of the landing surface by applying the transformation to the captured image; comparing the virtual image to the reference image to generate a difference map; segmenting the difference map to detect one or more foreign objects on the landing surface; and displaying the one or more foreign objects on a display to one or more operators of the vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart for an exemplary process for detecting foreign objects on a landing surface, according to one or more embodiments;

FIG. 4 depicts an exemplary user interface image of a landing surface having a detected landing surface, according to one or more embodiments;

FIG. 6 depicts the exemplary captured image of the landing surface of FIG. 4, a reference image of the landing surface, and a virtual image resulting from a transformation of the captured image, according to one or more embodiments;

FIG. 7 depicts the virtual image of FIG. 6 with a foreign object located on the landing surface and the resulting difference image between the virtual image and the reference image, according to one or more embodiments;

DETAILED DESCRIPTION OF EMBODIMENTS

Various embodiments of the present disclosure relate generally to the field of navigation for urban air mobility vehicles and, more particularly, to methods and systems of detecting foreign objects on a landing surface.

The present disclosure is directed to overcoming one or more of the challenges discussed above. UAM vehicles may be configured for autonomous flight, and in order to safely land the vehicle during such operation, the vehicle may detect a landing surface and determine if landing is feasible and safe. Environmental factors, such as weather or other dynamic lighting conditions, may complicate visual conditions so that basic optical sensors may be insufficient to perform sufficiently safe autonomous landings. In addition, these complicated visual conditions may interfere with being able to discern whether or not foreign objects on the landing surface could interfere with safe vehicle landing.

In general, the present disclosure is directed to methods and systems that are able to address one or more of the above challenges by detecting foreign objects on a landing surface to support autonomous vehicle landing and avoid damaging the vehicle or cargo, or injuring passengers. For instance, a system may use images captured by an onboard camera or cameras to provide autonomous vehicle systems with information regarding the state of the landing surface including the presence of one or more foreign objects. The methods and/or systems of the present disclosure for detecting foreign objects on a landing surface may have an advantage of improving the safety of autonomous landing procedures, thereby reducing or eliminating the need for a human operator to intervene to land the vehicle.

While this disclosure describes the systems and methods with reference to aircraft, it should be appreciated that the present systems and methods may be applicable to various other vehicles, including those of drones, spacecraft, or any other manned, unmanned, autonomous, and/or internet-connected vehicles.

Figure 1:
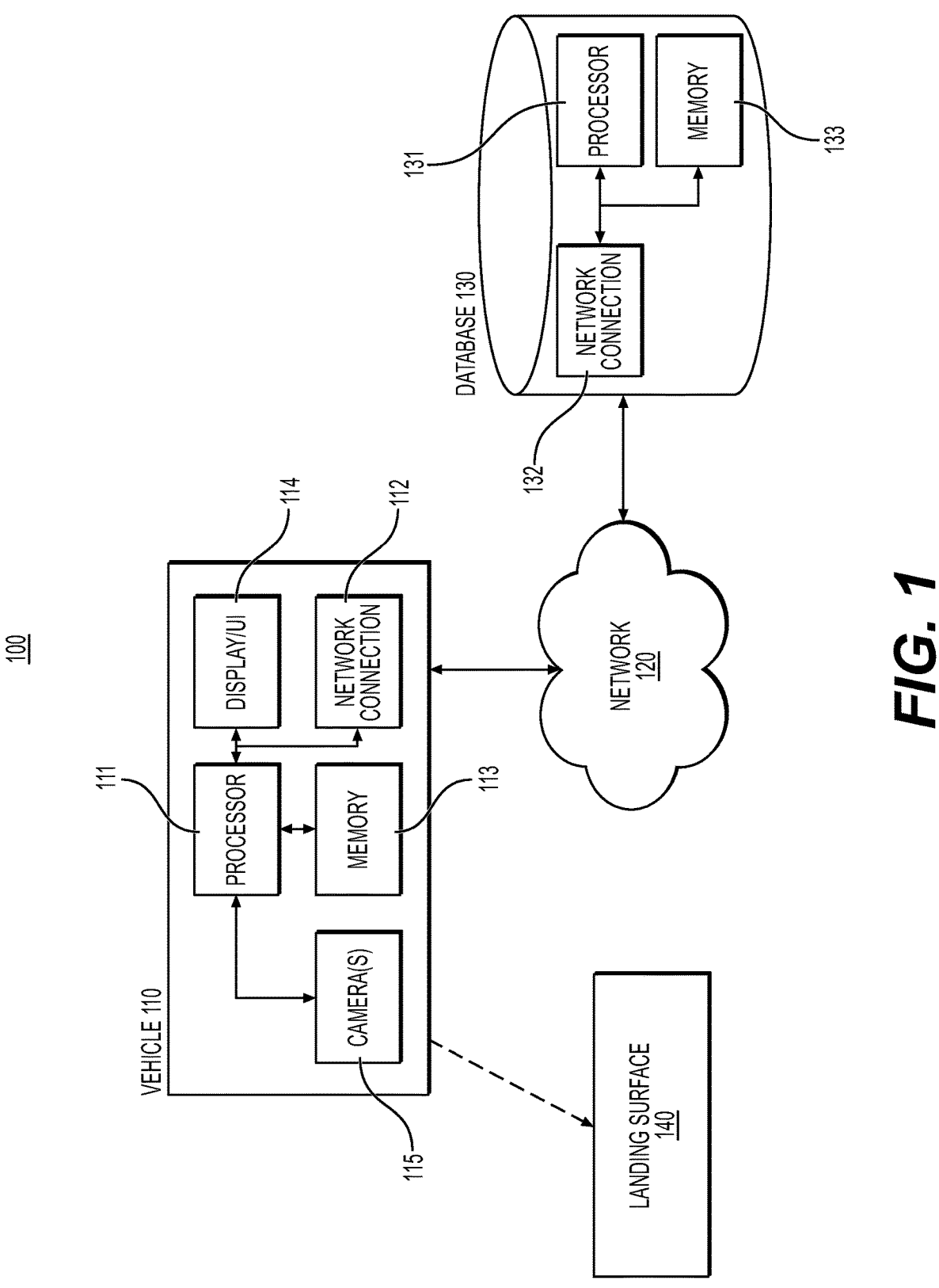
FIG. 1 depicts an exemplary system environment in which methods, systems, and other aspects of the present disclosure may be implemented.

FIG. 1 depicts an example of a system environment 100 in which methods, systems, and other aspects of the present disclosure may be implemented. The system environment 100 of FIG. 1 may include a vehicle 110, a network 120, one or more databases 130, and a landing surface 140. Vehicle 110 may include processor 111 in communication with a plurality of other components such as network connection 112, memory 113, display/user interface (UI) 114, and one or more cameras 115. Processor 111 may include one or more processors that comprise the computing and flight management systems of vehicle 110. Memory 113 may be one or more components configured to store data related to vehicle 110, including instructions for operating flight components and aircraft systems (e.g., autopilot, route planning, communication). Processor 111 and memory 113 may display information to, and receive inputs from an operator of vehicle 110 via display/UI 114. Display/UI 114 may be of any suitable type, such as one or more monitors, touchscreen panels, heads-up displays, and may include operator input devices such as joysticks, buttons, touch-responsive panels, mice, trackpads, voice recognition devices, and the like. In some embodiments, display/UI 114 may be physically located onboard the aircraft, and in some embodiments all or a portion of display/UI 114 may be accessed remotely.

Vehicle 110 can include one or more cameras 115 to capture images of (or other information indicative of) the surroundings of the vehicle. In some embodiments, the one or more cameras 115 may include one or more of video cameras, infrared cameras, thermal cameras, stereoscopic cameras, camera arrays, or other suitable devices for capturing images and/or information regarding an area, such as landing surface 140, positioned below vehicle 110. The one or more cameras 115 may be attached to a lower surface of the vehicle, such as an underside or bottom of the vehicle, and may be fixedly or movably mounted.

Vehicle 110 may use network connection 112 to communicate with other elements of the system environment, for example, via network 120 or directly by radio communication. Network 120 may be implemented as, for example, the Internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

One or more databases 130 may be repositories for system information such as map data, building data, flight plan data, and the like. Database 130 may include a processor 131, a network connection 132, and a memory 133. Memory 133 may store data, processor 131 may access and organize the stored data to respond to requests and provide updates to the stored data, and information may be provided to other elements in system environment 100 via network connection 132. In some embodiments, database 130 may communicate directly with vehicle 110 via network 120.

Figure 2:
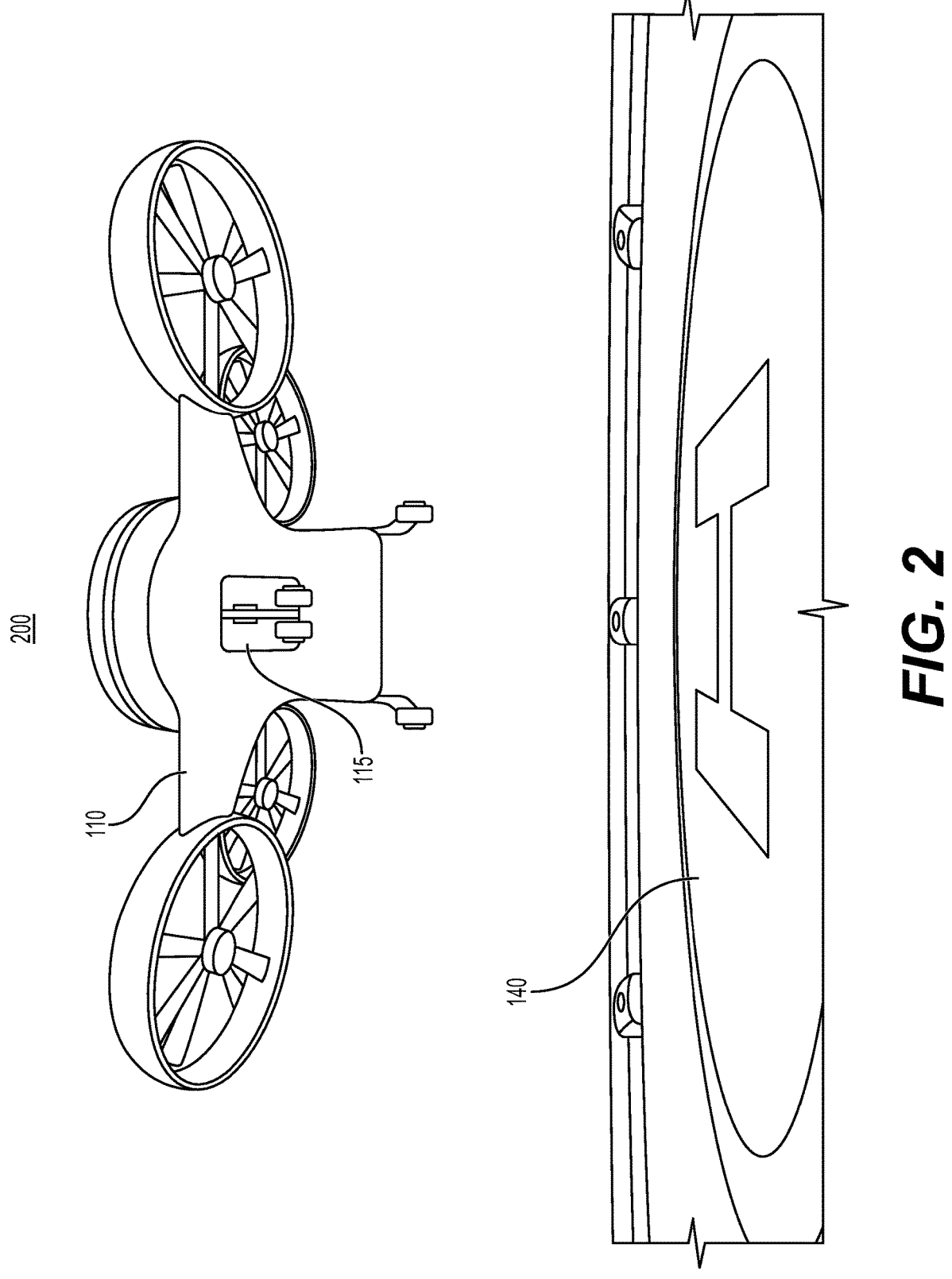
FIG. 2 depicts an exemplary vehicle having a camera on a lower surface thereof on which methods, systems, and other aspects of the present disclosure may be implemented.

FIG. 2 is an exemplary depiction of airspace 200 and vehicle 110 as vehicle 110 approaches landing surface 140. In the depicted embodiment, camera 115 is affixed to the underside of vehicle 110 to provide images of landing surface 140 to assist in autonomously landing vehicle 110.

FIG. 3 illustrates an exemplary method 300 for detecting foreign objects on a landing surface in accordance with embodiments of the present disclosure. It should be understood that the steps described herein, and the sequence in which they are presented, are merely illustrative such that additional and/or fewer steps may be included without departing from the scope of the present disclosure.

Beginning at step 310, vehicle 110 may capture one or more images of the area below vehicle 110, for example, via one or more cameras 115 associated with vehicle 110. Having obtained the one or more images, at step 320, processor 111 can then detect landing surface 140 present in the captured image. As depicted in FIG. 4, this can be accomplished by, for example, applying shape detection algorithms to the captured image, reading codes such as bar codes or QR codes, using other unique features present on landing surface 140, and/or using suitable machine learning techniques. In some embodiments, the landing surface detection may leverage additional sources of information such as geographic location, radio communications, and/or accessing a database of known landing pad features. Graphical user interface (GUI) 400, illustrates how the captured image, including ground 410 and landing surface 140, is processed by processor 111 to determine the portion of the captured image that includes landing surface 140, resulting in the identification of detected surface 420. Then using the available information, such as one or more databases of landing surfaces or location/map data, the detected surface 420 can be identified as corresponding to a particular landing pad.

Based on the identification of the detected surface 420 present in the image, at step 330, processor 111 may retrieve a reference image for the detected landing surface. For example, vehicle 110 may contact one or more databases 130 to access a reference image of landing surface 140. For example, the reference images may be a part of a small dataset of images taken without foreign objects, or in some embodiments may be a virtual or design image. The reference images may not need to be captured from multiple angles and/or under differing weather and lighting conditions, though additional reference images may be used.

Figure 5:
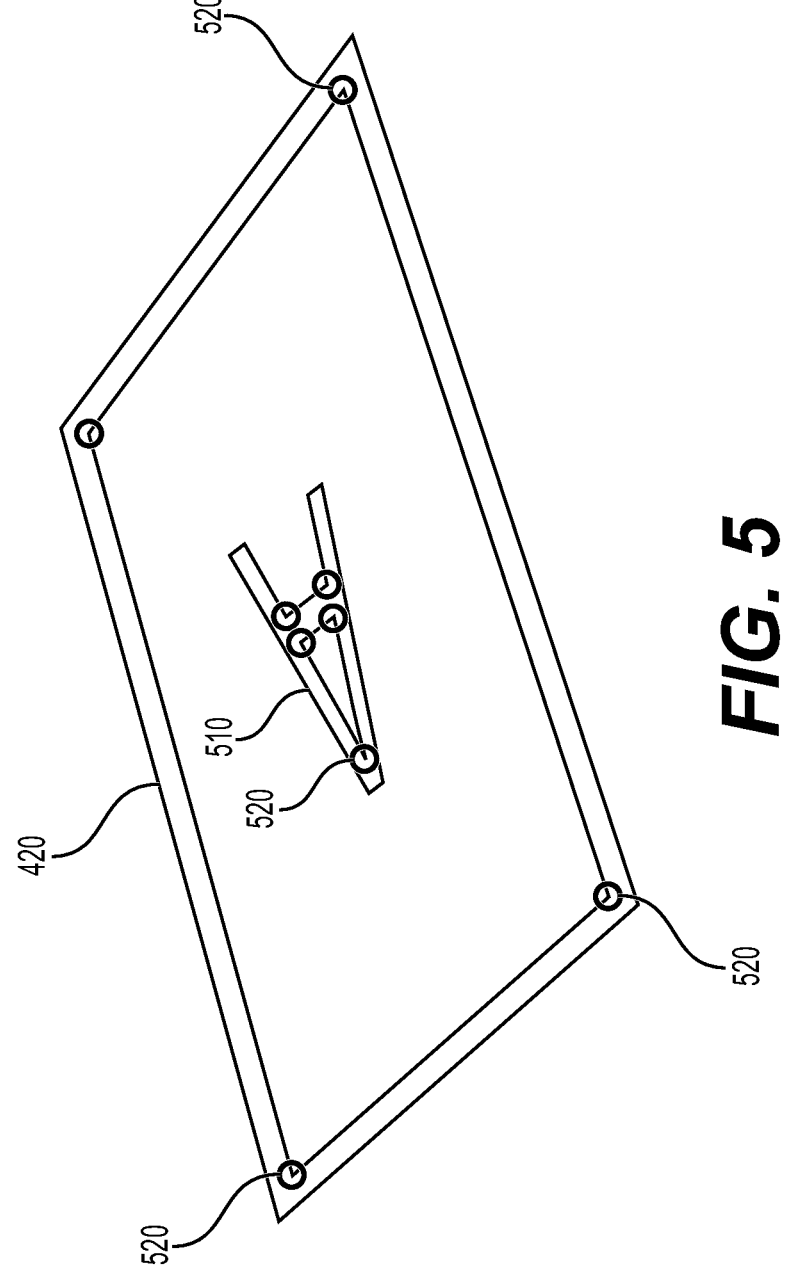
FIG. 5 depicts the exemplary image of the landing surface of FIG. 4 with feature points identified, according to one or more embodiments.

Once processor 111 has retrieved a suitable reference image corresponding to the detected surface 420 identified in the captured image, at step 340, processor 111 can analyze the captured image and the reference image and extract a plurality of feature points 520 present in both the captured image and the reference image. FIG. 5 illustrates an exemplary detected surface 420, including a landing surface feature 510, with a plurality of extracted feature points 520. These feature points 520 may be selected to be detectable points present in both the captured image as well as the reference image such as corners, edges, and/or portions of one or more of the landing surface feature 510 present in the images. The number of feature points 520 detected should be at least three, however the inclusion of additional points can make the transformation more accurate in the later steps of the disclosed object detection methods.

Based on the feature points identified, at step 350, processor 111 can determine a transformation between the captured image and the reference image by correlating the plurality of feature points between the captured image and the reference image. Because the captured and reference images are two-dimensional depictions of three-dimensional space, the positioning of the feature points 520 in the images can be used to determine the camera motion between the images. In some embodiments, the transformation can be determined using a suitable method of solving a perspective-n-point (PnP) problem. This analysis can allow processor 111 to estimate the position that the captured image was taken from, in relation to the position that the reference image was taken from. The transformation solution can include two main components: the rotation (R) and the translation (T). The T component corresponds to the position of the camera in space, while the R component corresponds to the orientation of the camera.

At step 360, processor 111 can create a virtual image by applying the transformation to one of the captured image or the reference image. In some embodiments, the virtual image is created by applying the transformation to the captured image. As illustrated in FIG. 6, captured image 610 was taken from a different camera angle than reference image 620, however the transformation (determined from the correlation of the feature points 520) allows processor 111 to create a virtual image 630 based on captured image 610, but that appears to be taken from the same camera position as the reference image.

In general, the disclosure will discuss embodiments wherein the captured image is transformed into a virtual image taken from the position of the camera in the reference image, but as the goal of the transformation is to have two images that appear to have been captured from the same camera position, other embodiments may transform the reference image into the virtual image.

With virtual image 630 generated, at step 370, processor 111 can compare virtual image 630 to the image that was not transformed to detect one or more differences that may be indicative of the presence of foreign objects. For example, where virtual image 630 was generated by transforming captured image 610, virtual image 630 can be provided as an input to a neural network architecture to be compared to reference image 620 as depicted in FIG. 7.

In some embodiments, the neural network can have an encoder-decoder architecture. In these applications, the network has two main components. The first component is an encoder which can take an inputted image and transform it into a feature with a fixed shape. The second component is a decoder which can maps the encoded feature (having a fixed shape) to an image-shape output. In such embodiments, once the network is trained, virtual image 630 can be provided as an input to the encoder-decoder, and the network can output a reconstructed virtual image without the foreign object. In this way, the encoder-decoder can acts as a reinforcement tilter, endeavoring to remove the foreign objects from the original virtual image 630.

Then, a comparator can find the differences between the virtual image 630 and the reconstructed virtual image from encoder-decoder. When the differences are identified, the difference image 710 can then be analyzed by processor 111 to determine if they are indicative of a foreign object 720. This difference image 710 (also referred to as a "difference map") may then be segmented to determine the size, number, and/or shape of the one or more foreign objects 720. For example, difference image 710 may then be provided as an input to a segmentation process, which can output information regarding the detected foreign objects, for example, the shape, number, and location of those objects.

In some embodiments, processor 111 is able to go a step further and use an appropriate algorithm, such as a machine-learning algorithm, to determine the type of object present on landing surface 140. In turn, the determination of the size, position, and/or identity of foreign object(s) 720 can then be used to aid the vehicle 110 in safely landing on landing surface 140, or may notify one or more operators that landing surface 140 is not sufficiently clear for vehicle 110 to land. For example, if processor 111 identifies foreign object 720 as likely being small debris, such as leaves or trash that have blown onto landing surface 140, vehicle 110 may still be able to safely and autonomously land, while if foreign object 720 is identified as a larger or more hazardous object, such as a fallen tree, processor 111 may determine that vehicle 110 is not able to safely land.

Methods and systems for detecting foreign objects on a landing surface in accordance with the present disclosure may be able to provide an autonomous vehicle landing system with critical information regarding the state of a desired landing location. This information may be displayed visually to one or more vehicle operators and/or may be an input into an autonomous vehicle's navigation or control system. By using captured, virtual, and reference images to detect and/or identify foreign objects on a landing surface, vehicles may be able to operate autonomously, without the need to communicate with the ground, and/or in a greater number of situations while increasing the safety of the operation.

Figure 8:
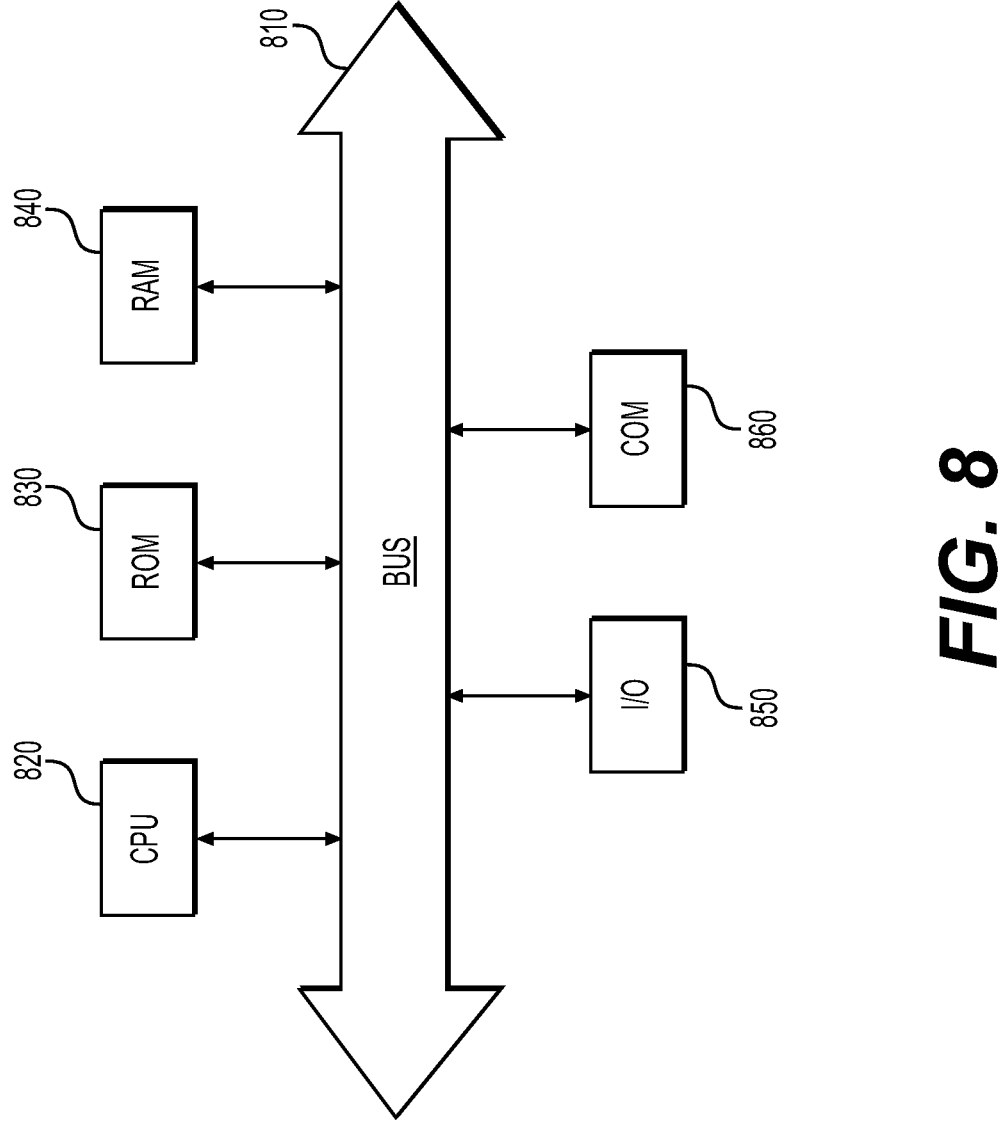
FIG. 8 depicts an exemplary system that may execute techniques presented herein.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

As used herein, a "machine learning model" is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative.

As used herein, the singular forms "a," "an," and "the" include plural reference unless the context dictates otherwise. The term "or" is meant to be inclusive and means either, any, several, or all of the listed items.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method of detecting foreign objects on a landing surface comprising:
    capturing an image from one or more cameras associated with a vehicle;
    detecting the landing surface present in the captured image;
    retrieving a reference image for the detected landing surface from a database;
    extracting a plurality of feature points present in both the captured image and the reference image;
    determining a transformation between the captured image and the reference image by correlating the plurality of feature points between the captured image and the reference image;
    creating a virtual image by applying the transformation to one of the captured image or the reference image;
    comparing the virtual image to the other one of the captured image or the reference image that was not transformed to detect one or more foreign objects based on the differences between the virtual image and the other one of the captured image or the reference image that was not transformed, wherein comparing the virtual image to the other one of the captured image or the reference image that was not transformed comprises:
        generating, in an instance in which a first foreign object of the one or more foreign objects is detected, a reconstructed virtual image by removing the first foreign object from the virtual image;
        generating a difference image, wherein, in an instance in which the first foreign object of the one or more foreign objects is detected, the difference image is indicative of the first foreign object; and
        segmenting the difference image to identify a feature of the first foreign object; and
    determining a landing surface state of the landing surface based on the difference image, wherein determining the landing surface state of the landing surface comprises:
        determining, based at least in part on the feature of the first foreign object, that a landing threshold for the vehicle is satisfied; or
        determining, based at least in part on the feature of the first foreign object, that the landing threshold for the vehicle is not satisfied.

2. The method of claim 1, wherein the one or more cameras are mounted on a lower surface of the vehicle.

3. The method of claim 1, wherein the plurality of feature points present in both the captured image and the reference image includes at least three feature points.

4. The method of claim 3, wherein correlating the plurality of feature points between the captured image and the reference image includes solving a perspective-n-point problem.

5. The method of claim 1, wherein the transformation includes a rotation and a translation.

6. The method of claim 1, wherein detecting the one or more foreign objects includes segmenting the difference image to identify the one or more foreign objects.

7. The method of claim 1, further including, after detecting the one or more foreign objects, displaying the one or more foreign objects on a display to one or more operators of the vehicle.

8. A system for detecting foreign objects on a landing surface comprising:
    one or more cameras associated with a vehicle;
    a memory storing instructions; and
    one or more processors configured to execute the instructions to perform operations including:
        capturing an image from the one or more cameras associated with the vehicle;
        detecting the landing surface present in the captured image;
        retrieving a reference image for the detected landing surface from a database;
        extracting a plurality of feature points present in both the captured image and the reference image;
        determining a transformation between the captured image and the reference image by correlating the plurality of feature points between the captured image and the reference image;
        creating a virtual image by applying the transformation to one of the captured image or the reference image;
        comparing the virtual image to the other one of the captured image or the reference image that was not transformed to detect one or more foreign objects based on the differences between the virtual image and the other one of the captured image or the reference image that was not transformed, wherein comparing the virtual image to the other one of the captured image or the reference image that was not transformed comprises:
            generating, in an instance in which a first foreign object of the one or more foreign objects is detected, a reconstructed virtual image by removing the first foreign object from the virtual image;
            generating a difference image, wherein, in an instance in which the first foreign object of the one or more foreign objects is detected, the difference image is indicative of the first foreign object; and segmenting the difference image to identify a feature of the first foreign object;

and determining a landing surface state of the landing surface based on the difference image, wherein determining the landing surface state of the landing surface comprises:

determining, based at least in part on the feature of the first foreign object, that a landing threshold for the vehicle is satisfied; or determining, based at least in part on the feature of the first foreign object, that the landing threshold for the vehicle is not satisfied.

9. The system of claim 8, wherein the one or more cameras are mounted on a lower surface of the vehicle.

10. The system of claim 8, wherein the plurality of feature points present in both the captured image and the reference image includes at least three feature points.

11. The system of claim 10, wherein correlating the plurality of feature points between the captured image and the reference image includes solving a perspective-n-point problem.

12. The system of claim 8, wherein the transformation includes a rotation and a translation.

13. The system of claim 8, wherein detecting the one or more foreign objects includes segmenting the difference image to identify the one or more foreign objects.

14. The system of claim 8, further including, after detecting the one or more foreign objects, displaying the one or more foreign objects on a display to one or more operators of the vehicle.

15. A computer-implemented method for detecting foreign objects on a landing surface, the method comprising:

capturing, by one or more cameras mounted on a lower surface of a vehicle, an image including the landing surface;

detecting, by one or more processors, the landing surface present in the captured image;

retrieving, from a database, a reference image for the landing surface present in the captured image;

extracting, from both the captured image and the reference image, a plurality of corresponding feature points;

determining a transformation including a rotation and a translation between the captured image and the reference image by correlating the plurality of corresponding feature points;

creating a virtual image of the landing surface by applying the transformation to the captured image;

comparing the virtual image to the reference image to detect one or more foreign objects, wherein comparing the virtual image to the reference image comprises:

generating a reconstructed virtual image by removing the one or more foreign objects from the virtual image;

generating a difference image indicative of the one or more foreign objects; and segmenting the difference image to detect the one or more foreign objects on the landing surface based on the differences between the virtual image and the reference image;

determining a landing surface state of the landing surface based on the difference image, wherein determining the landing surface state of the landing surface comprises:

determining, based at least in part on the feature of the one or more foreign objects, that a landing threshold for the vehicle is satisfied; or determining, based at least in part on the feature of the one or more foreign objects, that the landing threshold for the vehicle is not satisfied; and displaying the one or more foreign objects on a display to one or more operators of the vehicle.

16. The method of claim 15, wherein the plurality of corresponding feature points includes at least three feature points, and wherein correlating the plurality of corresponding feature points includes solving a perspective-n-point problem.

17. The method of claim 1, wherein generating the difference image further comprises:

generating the reconstructed virtual image by applying the virtual image to a neural network; and generating the difference image by comparing the reconstructed virtual image and the virtual image.

18. The method of claim 1, wherein detecting the landing surface present in the captured image comprises accessing one or more known landing surface features from the database or a second database.

19. The method of claim 1, wherein generating the reconstructed virtual image by removing the first foreign object from the virtual image comprises encoding the first foreign object into a fixed shape feature.

* * * * *